Figure 3:
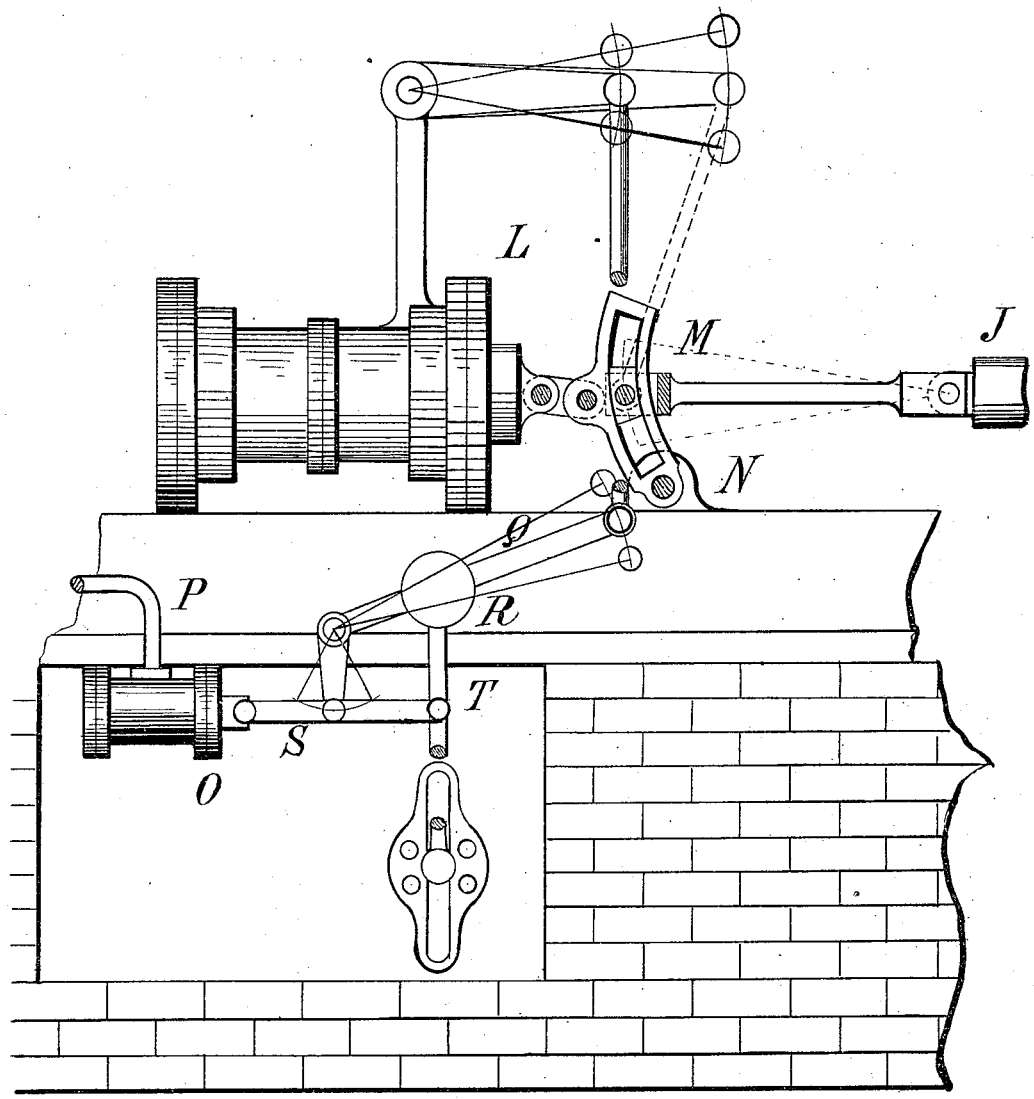

(No Model.) 2 Sheets—Sheet 1.
J. S. STEVENS, C. G. MAJOR & T. W. BARBER.
HYDRAULIC LIFT.
No. 313,550. Patented Mar. 10, 1885.
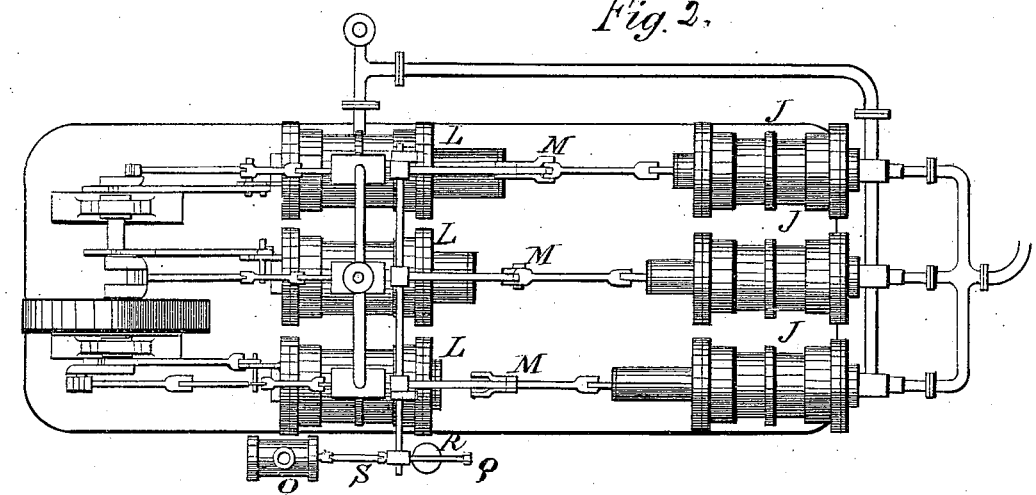
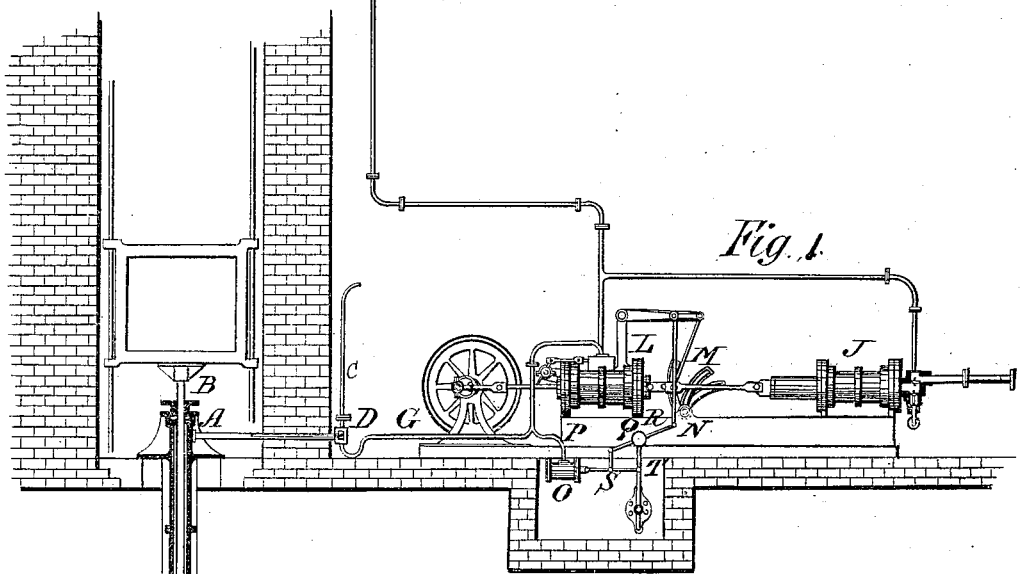
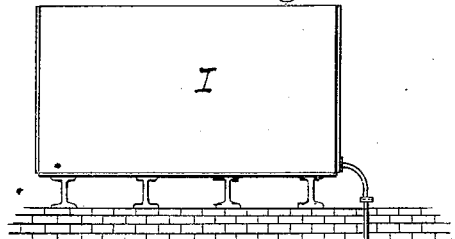
Witnesses
Percy Hedges
Harry Green.
Inventors
John Sanders Stevens
Charles George Major
Thomas Walter Barber
Per F. W. Roger
Attorney (No Model.) 2 Sheets—Sheet 2.

J. S. STEVENS, C. G. MAJOR & T. W. BARBER.
HYDRAULIC LIFT.

No. 313,550. Patented Mar. 10, 1885.

Witnesses:
Willard R Haight
J. F. White.

Inventors:
John Sanders Stevens
Charles George Major
Thomas Walter Barber
by W. H. Babcock
Attorney